US010336525B2

(12) United States Patent
Goldmeier

(10) Patent No.: US 10,336,525 B2
(45) Date of Patent: Jul. 2, 2019

(54) PLANOGRAM DISPLAY FOR VERTICALLY ORIENTED PRODUCT CONTAINING DISPLAY CARDS

(71) Applicant: Steven Goldmeier, Plainview, NY (US)

(72) Inventor: Steven Goldmeier, Plainview, NY (US)

( * ) Notice: Subject to any disclaimer, the term of this patent is extended or adjusted under 35 U.S.C. 154(b) by 0 days.

(21) Appl. No.: 15/868,308

(22) Filed: Jan. 11, 2018

(65) Prior Publication Data

US 2018/0237211 A1 Aug. 23, 2018

Related U.S. Application Data

(60) Provisional application No. 62/460,679, filed on Feb. 17, 2017.

(51) Int. Cl.
| | |
|---|---|
| *B65D 21/02* | (2006.01) |
| *B65D 25/22* | (2006.01) |
| *B65D 25/54* | (2006.01) |
| *B65D 75/36* | (2006.01) |
| *B65D 83/00* | (2006.01) |
| *G06Q 10/08* | (2012.01) |

(52) U.S. Cl.
CPC ..... *B65D 83/0088* (2013.01); *B65D 21/0213* (2013.01); *B65D 25/22* (2013.01); *B65D 25/54* (2013.01); *B65D 75/366* (2013.01); *G06Q 10/087* (2013.01); *B65D 2203/02* (2013.01)

(58) Field of Classification Search
CPC .... B65D 21/0213; B65D 25/22; B65D 25/54; B65D 75/366; B65D 75/368; B65D 2203/02

USPC ........ 211/59.1, 57.1; 206/461–471; 248/220.41
See application file for complete search history.

(56) References Cited

U.S. PATENT DOCUMENTS

| | | | | |
|---|---|---|---|---|
| 3,307,693 | A | * | 3/1967 | Bittner ............... B65D 75/326 206/461 |
| 3,463,305 | A | | 8/1969 | Cline |
| 3,621,996 | A | * | 11/1971 | Seyer ............... B65D 73/0057 206/463 |
| 3,696,937 | A | | 10/1972 | Braverman |
| 3,799,357 | A | | 3/1974 | Govang |
| 3,861,528 | A | * | 1/1975 | Damuth ............... B65D 75/322 206/459.5 |
| 4,058,220 | A | * | 11/1977 | Torongo ............... B65D 75/36 206/461 |
| 4,245,414 | A | | 1/1981 | Shypula |
| 4,616,753 | A | * | 10/1986 | Aslan ............... A47F 5/0807 211/57.1 |

(Continued)

*Primary Examiner* — Chun Hoi Cheung
(74) *Attorney, Agent, or Firm* — Alfred M. Walker

(57) ABSTRACT

A retail planogram display includes a series of display cards of varying heights, having a protruding hole at the top for inserting the cards on a hook, but where cards of varying heights can be provided so that the longest one is the most interior one, with a medium sized one in front of that and a third smaller one on top of the two cards, wherein the actual product, such as toy cars, are in exposed, transparent bubble boxes, then nest one on top of each other on the same hook. In an alternate embodiment, a dispensing storage sleeve can be provided, where the packages of varying heights can be dispensed from the sleeve, wherein the sleeves have retaining means, such as coil springs or other flexible detents to keep the display cards in place until pulled out by a consumer.

13 Claims, 6 Drawing Sheets

(56) References Cited

U.S. PATENT DOCUMENTS

| | | | | |
|---|---|---|---|---|
| 4,986,421 A * | 1/1991 | Lipsitz | ............... | B65D 73/0057 |
| | | | | 206/459.5 |
| 5,249,683 A * | 10/1993 | Baucom | ............. | B65D 73/0057 |
| | | | | 206/462 |
| 5,730,290 A | 3/1998 | Futo | | |
| 6,311,845 B1 * | 11/2001 | Uren | ...................... | B65D 5/526 |
| | | | | 206/499 |
| 6,386,368 B1 * | 5/2002 | Pirro | ...................... | B65D 5/526 |
| | | | | 206/471 |
| 6,467,617 B1 | 10/2002 | Chen | | |
| 6,473,984 B1 | 11/2002 | Splain et al. | | |
| 8,844,758 B1 | 9/2014 | Kummer | | |
| 8,939,285 B2 | 1/2015 | Trontel et al. | | |
| 9,334,080 B2 * | 5/2016 | Yamamoto | ............. | B65D 71/36 |
| 2004/0262184 A1 * | 12/2004 | Livesay | .................... | A47F 7/03 |
| | | | | 206/471 |
| 2005/0161361 A1 * | 7/2005 | Martins | ................. | A47F 5/0823 |
| | | | | 206/461 |
| 2007/0288296 A1 | 12/2007 | Lewis | | |
| 2012/0022913 A1 | 1/2012 | Volkmann et al. | | |

\* cited by examiner

PLANOGRAM DISPLAY FOR VERTICALLY ORIENTED PRODUCT CONTAINING DISPLAY CARDS

RELATED APPLICATIONS

This application claims the benefit of provisional patent application No. 62/460,679 filed Feb. 17, 2017 (the '679 application) under 35 USC § 119(e). The '679 application is incorporated by reference herein.

FIELD OF THE INVENTION

The present invention relates to retail display of packaging on nested display cards.

BACKGROUND OF THE INVENTION

Display cards are often mounted with a hole in the top so they can be slid onto a forward advancing display hook off of a peg board display in a retail establishment. Normally, the products are horizontally nested in front and behind each other, where the display card is a flat panel, having a hole to accommodate the hook therethrough with advertising material indicia printed on the card and the bottom part includes a transparent plastic bubble, such as a box-shaped bubble containing a toy, such as a toy car, for example HOT WHEELS®.

The problem is that each is in front of the other, so there is no way to utilize one hook to display different cars oriented vertically on top of each other. Display cards with holes for hooks are known, such as in the U.S. Pat. No. 6,467,617 B1 of Chen, for displaying fishing reel packages and U.S. Pat. No. 8,939,285 B2 of Trontel for displaying steering wheel locking hooks, where the protrusions are provided in the front part of the package and reciprocating recesses are provided so that the products can be horizontally nested, but not vertically.

It is also known that products of varying heights can be displayed, such as in FIGS. 17-19 of U.S. Pat. No. 8,844,758 B1 of Kummer, which discloses a shelf display displaying varying height food jars.

OBJECTS OF THE INVENTION

It is therefore an object of the present invention to provide a plurality of display cards which have varying vertical heights so that the cards can be nested, one on top of in each other, exposing the plastic transparent bubbles and products therein, nested on top of each other, by virtue of the varying vertical height of the display cards.

It is also an object of the invention to modify a package so that varying height packages can be nested together without the need of different sized shelves of different heights.

It is also an object of the invention to provide such nested product displays on a wall mounted planogram with protruding hooks.

It is yet another object of the invention to provide such nested product displays is a dispenser container, where sets of the nested product display cards are stored under spring loaded or other resilient pressure, and can be dispensed therefrom in sets of nested product display cards.

It is yet another object of the present invention to provide an efficient retail display environment which maximizes space usage while maximizing the number of different products displayed in the retail display environment for viewing exposure by customers.

It is also an object of the present invention to provide a self standing or wall mounted retail display planogram which maximizes space usage while maximizing the number of different products displayed in the retail display environment, and which utilizes nested pluralities of product displays for viewing exposure by customers.

Other objects will become apparent from the following description of the present invention.

SUMMARY OF THE INVENTION

In keeping with these objects, and objects which may become apparent, the present invention includes a series of display cards of varying heights, having a protruding hole at the top for inserting the cards on a hook, but where cards of varying heights can be provided so that the longest one is the most interior one, with a medium sized one in front of that and a third smaller one on top of the two cards, wherein the actual product, such as toy cars, are in exposed, transparent bubble boxes, and then nest one on top of each other on the same hook.

In an alternate embodiment, a dispensing storage sleeve can be provided, where the packages of varying heights can be dispensed from the sleeve, wherein the sleeves have retaining means, such as coil springs or other flexible detents to keep the display cards in place until pulled out by a consumer. In this alternate storage environment, the nested product display cards can be stored in a storage container having spring loaded or otherwise resilient product urging retainers, so that set of the nested product display cards with products therein, can be removed from the storage container and displayed upon hooks or other storage tools extending outward from a self standing kiosk or wall mounted retail planogram display panel/structure.

In this alternate storage embodiment, the container can be a hollow sleeve or hollow box container that contains the nested cards within, and the urging means. The urging means can be a leaf spring, for example, or little knobs external of the box sides to urge the panel forward as nested groups of the product display cards are removed. The urging means can also be combinations thereof, or any other resilient retaining means.

In this storage container embodiment, one or more nested sets of product display cards being, nested inside the hollow dispensing storage sleeve or container are collectively urged in place by flexible spring loaded retainers associated with the hollow dispensing storage sleeve or container, whereby one or more sets of nested product display containers is incrementally removable and dispensed from the hollow dispensing storage sleeve or container.

BRIEF DESCRIPTION OF THE DRAWINGS

The following description of the drawings is not meant to be limited and shows various embodiments of the subject matter of the present invention. It is noted that the invention is not limited to only the following precise embodiments shown

DETAILED DESCRIPTION OF THE INVENTION

Figure 1:
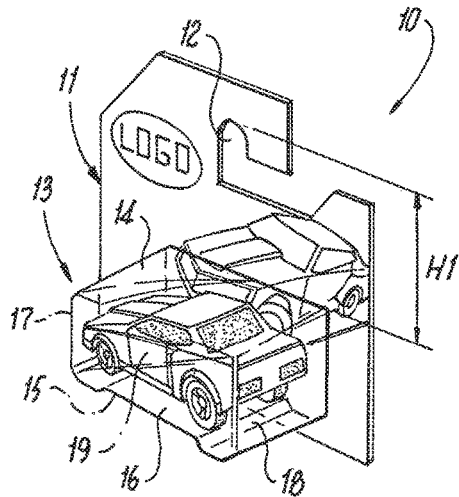
FIG. 1 is a perspective view of a display card showing a transparent package with a product therein of a specified small height.
Figure 2:
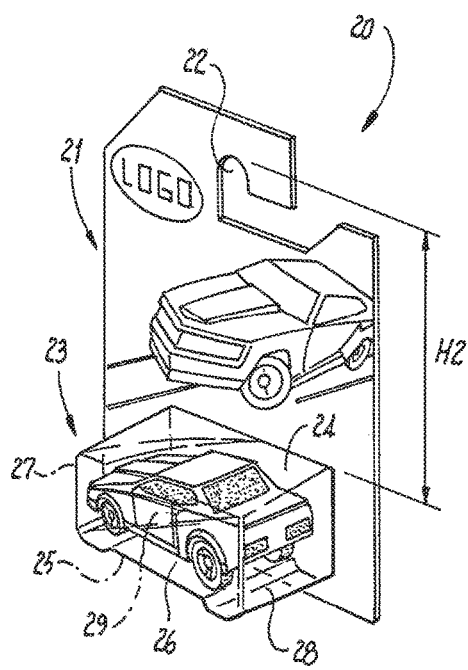
FIG. 2 is a perspective view of a display card showing a transparent package with a product therein of a specified medium height.
Figure 3:
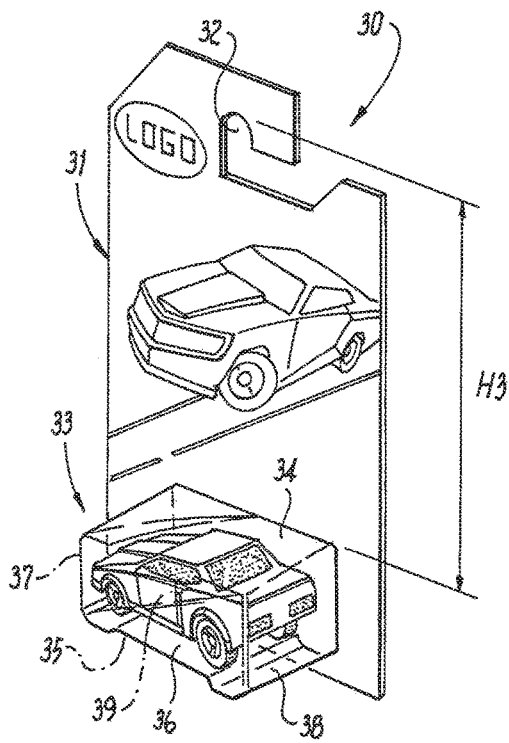
FIG. 3 is a perspective view of a display card showing a transparent package with a product therein of a specified larger tallest height.
Figure 4:
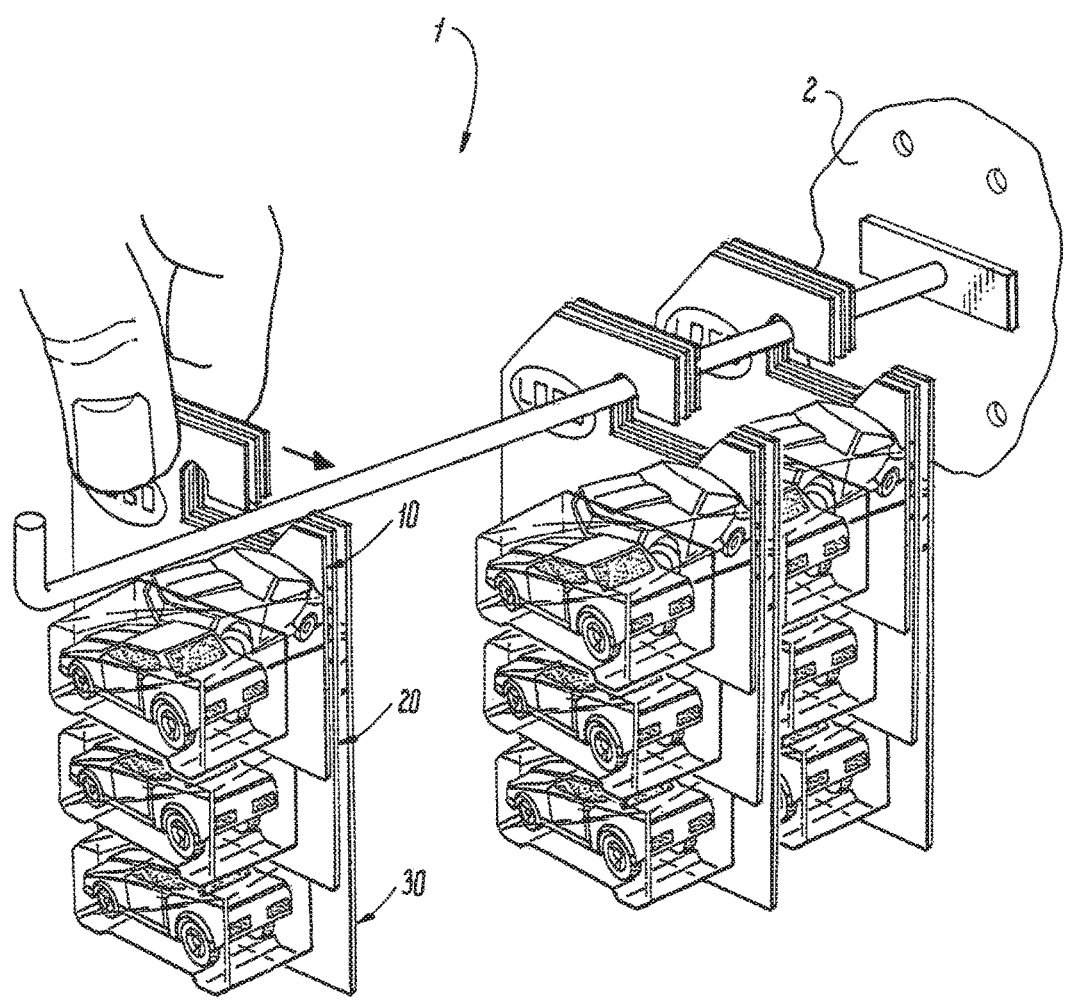
FIG. 4 is a perspective detail view showing nested sets of the product display cards of three heights being inserted upon a single hook at a retail establishment, with the transparent product containing boxes exposed for all three cards.

FIGS. 1, 2 and 3 show a planogram retail environment 1 of a set of a plurality of retail product display cards for consumer purchase, such as three product display cards 10, 20 and 30, nested together and displayed upon a hook 2 of the retail planogram environment 1 shown in FIG. 4, each having a transparent product package box 13 with a product 19 therein.

By "nesting", the term can mean that the product display cards have transparent product display boxes or bubbles, wherein the boxes are displayed one on top of each other. The can either be physically touching each other in top to bottom configurations, or a small space can be provided between each transparent product package box or bubble, so that the boxes or bubbles are substantially on top or under each other, but not exactly touching each other, so long as the consumer can see the entire contents of each box or bubble while the three product display cards are nested together in a vertical orientation, wherein the heights of the product display cards 10, 20 and 30 vary from smallest to largest of specified heights.

For example, FIG. 1 shows the product display card 10 with the shortest height "H1", FIG. 2 shows the product display card 20 with a medium height "H2" and FIG. 3 shows the product display card 30 with the tallest height "H3".

Each has a similar structure, but of differing heights "H1", "H2" and "H3". In FIG. 1, reference numeral 10 depicts for smallest card (on top), where reference numeral 11 represents the top portion of card 10 with commercial logo thereon and a hole 12 to engage hook 2 of the planogram environment 1. Reference numeral 13 depicts a clear plastic box for a product 19, such as a toy car, where reference numeral 14 depicts the top wall of plastic box, reference numeral 15 depicts the bottom wall of plastic box 13, reference numeral 16 depicts the front wall of transparent plastic box 13, and reference numerals 17, 18 depict the side walls of plastic box 13.

In FIG. 2, reference numeral 20 depicts for middle medium height card (nested under the smallest top product display card 10), where reference numeral 21 represents the top portion of card 20 with commercial logo thereon and a hole 22 to engage hook 2 of the planogram environment 1. Reference numeral 23 depicts a clear plastic box for a product 29, such as a toy car, where reference numeral 24 depicts the top wall of plastic box 23, reference numeral 25 depicts the bottom wall of plastic box 23, reference numeral 26 depicts the front wall of transparent plastic box 23, and reference numerals 27, 28 depict the side walls of plastic box 23

In FIG. 3, reference numeral 30 depicts for lowest and tallest height card (nested under the medium height middle product display card 20), where reference numeral 31 represents the top portion of card 30 with commercial logo thereon and a hole 32 to engage hook 2 of the planogram environment 1. Reference numeral 33 depicts a clear plastic box for a product 39, such as a toy car, where reference numeral 34 depicts the top wall of plastic box 33, reference numeral 35 depicts the bottom wall of plastic box 33, reference numeral 36 depicts the front wall of transparent plastic box 33, and reference numerals 37, 38 depict the side walls of plastic box 33

FIG. 4 shows a nested set of retail display cards 10, 20 and 30 being inserted upon a product display hook in a retail display planogram environment, where the hook extends outward from a wall panel or other free standing display structure, such as a kiosk, where the three product display cards 10, 20 and 30 are displayed for consumer purchase nested on top of each other with the transparent boxes exposed for all three cards, one of top of each other, with the transparent product box 13 of the shortest product display card 10 nesting on top of the transparent product display box 23 of product display card of medium height, and the transparent product display box of the product display card 20 of medium height nesting on top of the transparent product display box 33 of the product display card 30 of the tallest height.

Figure 5:
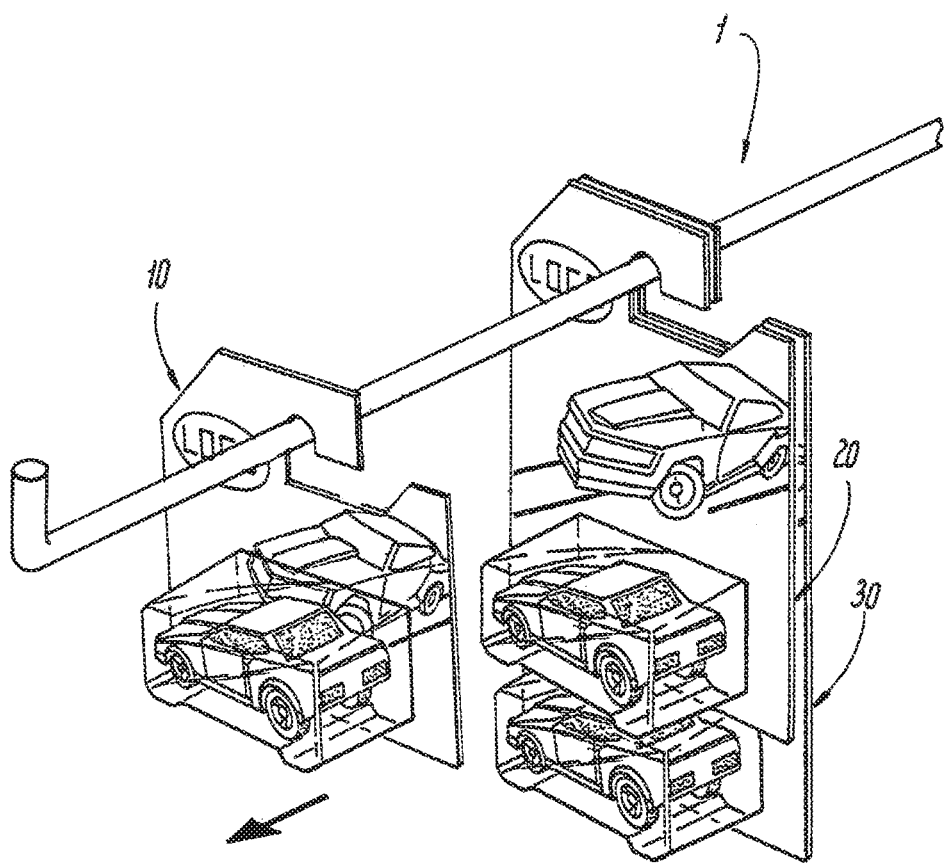
FIG. 5 is a perspective detail view showing the smallest product display card of FIG. 1 being removed in the direction of the arrow indicated from one of the nested sets of the nested product display cards nested on top of each other with the transparent product containing boxes exposed for all three cards.

FIG. 5 shows the removal of one display card 10 from the set of product display cards 10, 20, 30 for consumer purchase of product display card 10, leaving the remaining nested product display cards 20 and 30 remaining stored on the product display hook. FIG. 5 therefore shows the remaining two nested product display cards 20 and 30 still assembled on the hook 2 in a planogram retail merchandise display panel environment 1.

Figure 6:
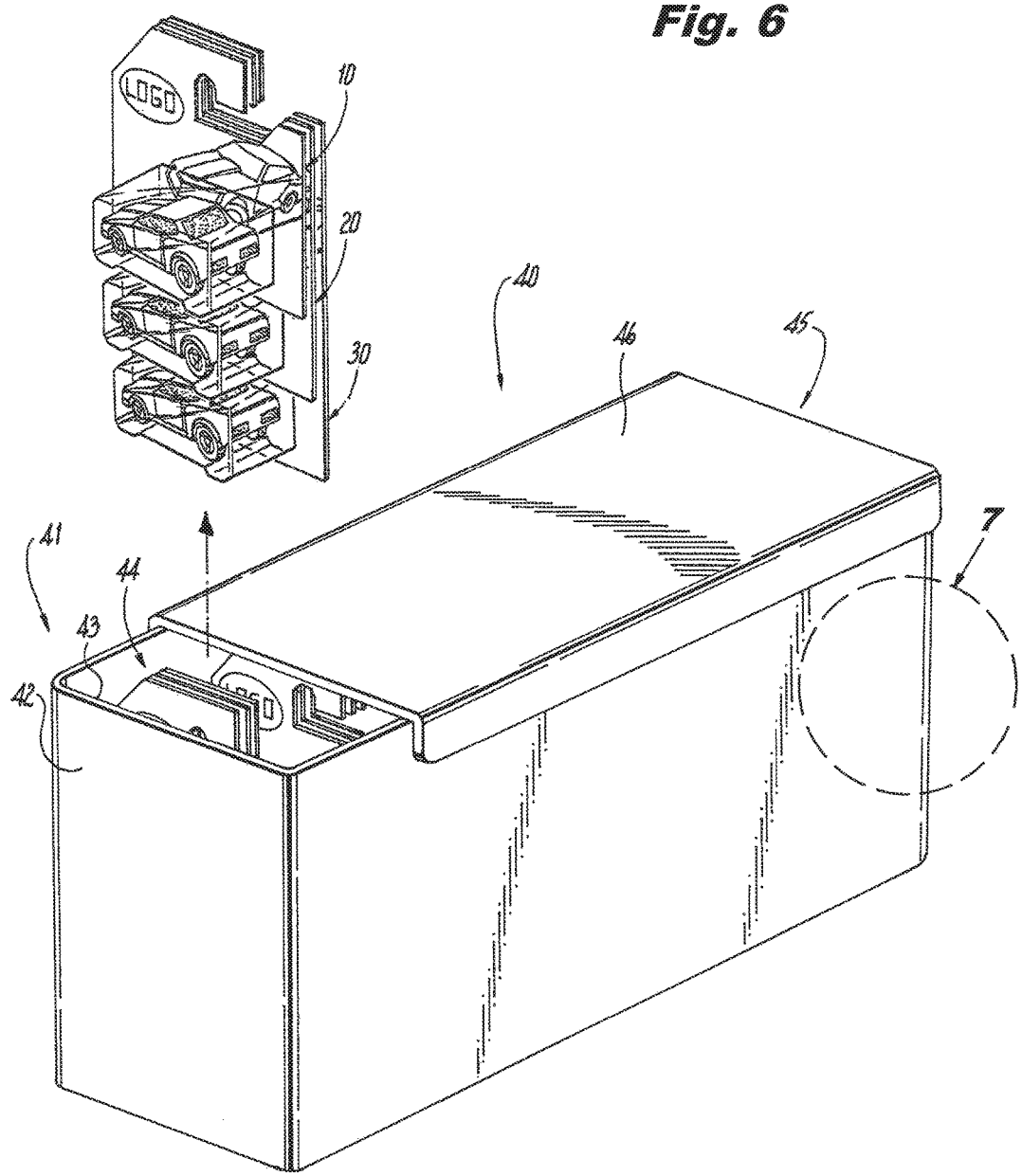
FIG. 6 is a perspective view of an alternate embodiment for storage of nested sets of pluralities of product display cards in a hollow sleeve or container, whereby the sets of nested product display cards are urged in place by spring loaded or other resilient urging means, so that they can be manually removed from the storage container or sleeve in a set of nested product display cards, for purchase or display in the planogram embodiments of FIGS. 1-5.
Figure 7:
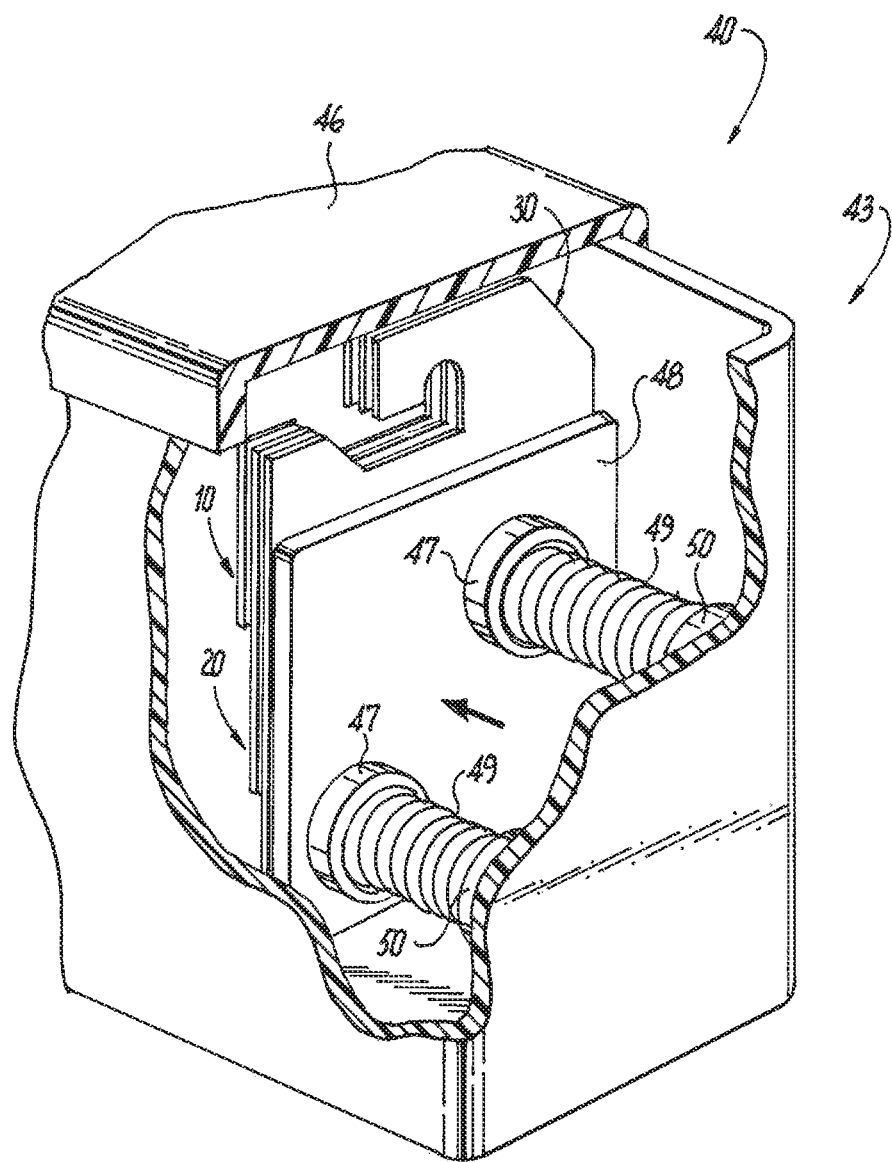
FIG. 7 is a close-up perspective detail view in partial cutaway of a spring loaded interior urging means for urging the nested sets of stored sets of product display cards therein, taken along circular dashed view line "7" of FIG. 6.
Figure 8:
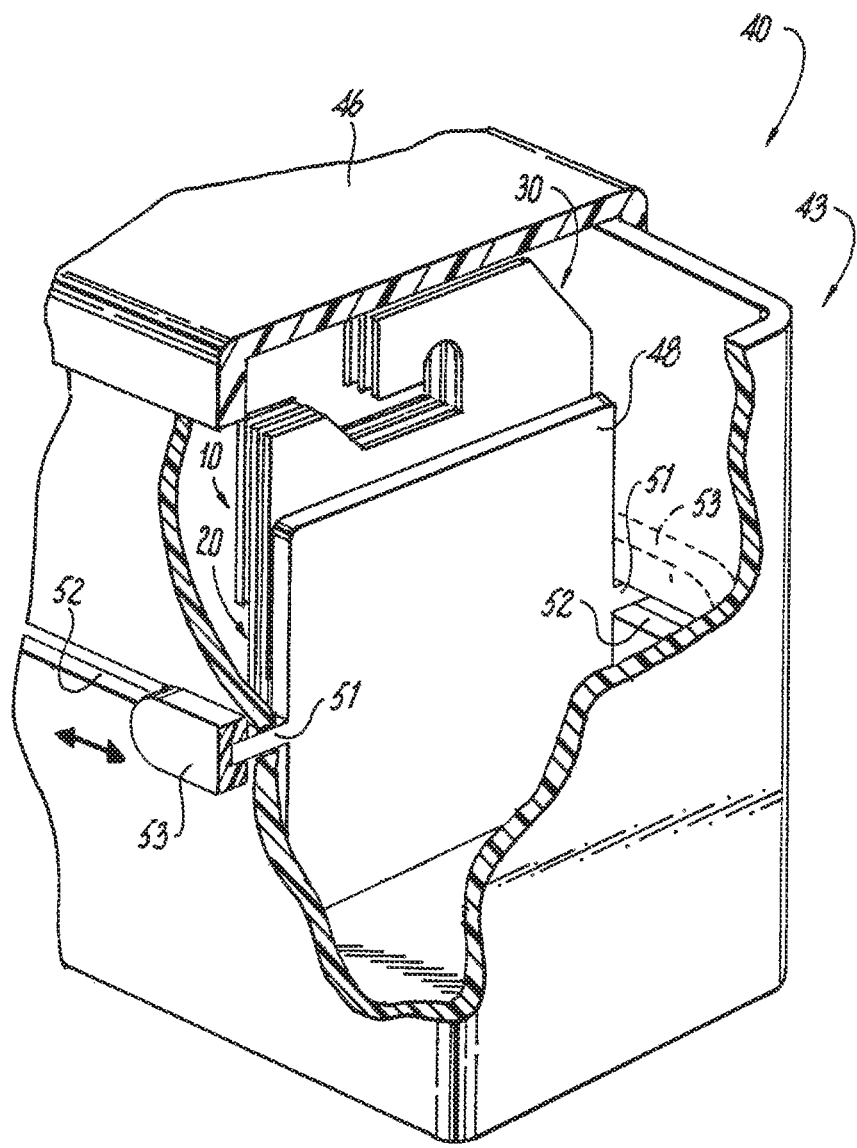
FIG. 8 is a close-up perspective detail view in partial cutaway of an alternate embodiment for removing a set of nested product display cards from an interior of a hollow container or sleeve, where an exterior button moves a retaining panel along a track or detents against the stored nested sets of product display cards, for urging the nested sets of stored sets of product display cards therein for removal therefrom.

FIGS. 6-8 show the alternate embodiment with a hollow dispensing storage sleeve or container 40 for the nested product display cards 10, 20, 30 of FIGS. 1, 2 and 3, which are nested inside the dispensing storage sleeve or container 40 and are held in place by flexible retaining means, such as coil springs 49 of FIG. 7 or flexible detents and movable interior wall panels 48 in the hollow interior 44 of sleeve or container 40.

As shown in FIGS. 6-8, reference numeral 40 depicts the hollow dispensing storage sleeve, having open bottom dispensing end 41, outer wall 42 of sleeve 40, inner wall 43 of sleeve 40, which has a hollow storage interior 44 therein.

Reference numeral 45 represents a top loading end of hollow sleeve or container 40, which is covered by removable storage top cover 46.

The directional arrow in FIG. 6 depicts the upward removal of a nested set of product display cards 10, 20, 30 from the storage sleeve or container 40.

FIG. 7 shows a spring loaded interior urging means for urging the nested sets of stored sets of product display cards 10, 20 and 30 nested together, including coil spring retainers 47 and 50 and base plate 48 containing one or more coil springs 49 inside hollow interior 44 of sleeve or container 40, whereby by virtue of coil springs 49, the nested sets of product display cards 10, 20 and 30 are each urged in place by the force of coil springs 49 pushing resiliently against base plate 48, as each set of product display cards 10, 20 and 30 is removed, leaving a plurality of remaining sets of other nested product display cards 10, 20 and 30, etc stored in place within dispenser sleeve or container 40.

FIG. 8 shows a further alternate embodiment where the sets of product display cards 10, 20 and 30 are stored in place by virtue of pressure from storage plate 48 connected to exterior push button 53, connected to storage plate 48 by connector 51, whereby storage plate 48 is moved forward manually by axial movement of exterior button 53 or pair of opposite sided buttons 53 movable along track 52 or pair of opposite sided tracks 52

The sets of product display cards 10, 20 and 30 can also be held in place by other urging means, such as resilient detents or living hinges (not shown) holding the display cards 10, 20 and 30 within the hollow storage sleeve or container 40.

In the foregoing description, certain terms and visual depictions are used to illustrate the preferred embodiment. However, no unnecessary limitations are to be construed by the terms used or illustrations depicted, beyond what is shown in the prior art, since the terms and illustrations are exemplary only, and are not meant to limit the scope of the present invention.

It is further known that other modifications may be made to the present invention, without departing the scope of the invention, as noted in the appended Claims.

I claim:

1. A nesting arrangement of a plurality of display cards comprising:
   each display card of the plurality of display cards in the nesting arrangement having a different height consisting of tall, medium and short heights;
   each card having a protruding transparent package box containing a product for display and a top portion with means to engage a hook; and
   each protruding transparent package box on each respective display card in the nesting arrangement having a differing location on its respective display card;
   said arrangement of cards being nested and mounted on said hook, with the tallest display card in a rear position and progressively shorter display cards in front of said tallest display card, all of said cards are flush with each other, with the protruding transparent package boxes appearing stacked and visible together to a potential purchaser, whereby different products can be displayed side by side on a single hook, and an increased number of such display cards can be mounted on the same hook due to nesting of said display cards.

2. The nesting arrangement of claim 1 in which said engaging means comprises holes in the top portions of said nested cards which are aligned for mounting on said hook.

3. The nesting arrangement of claim 1 in which multiple nesting arrangements are mounted on said hook.

4. The nesting arrangement of claim 3 in which a product logo appears on said top portion of each of the plurality of display cards.

5. The nesting arrangement of claim 4 in which said transparent package box is made of plastic material.

6. The nesting arrangement of claim 5 in which said product is a toy.

7. A nesting arrangement of a plurality of display cards comprising:
   each display card of the plurality of display cards having a protruding transparent package box containing a product for display and a top portion with means to engage a hook; and
   each protruding transparent package box on each respective display card in the nesting arrangement having a differing location on its respective display card so that when said display cards in said arrangement are nested, all of said display cards are flush with each other, with the protruding transparent package boxes being grouped and visible together to a potential purchaser, whereby different products are capable of displaying on a single hook.

8. A planogram assembly of product display cards with products of varying heights, comprising:
   a wall panel having a protruding hook for displaying display cards, a plurality of display cards each having a corresponding aperture hole in the top to accommodate the hook;
   each said display card having a mid-indicia area containing product description and logos and each said display card having a lower transparent box bubble portion having a product therein,
   wherein a first display card has a short height, a second display card has a medium height and a third display card has a taller height;
   wherein said display cards, when placed on said hook, overlap each other, wherein all three transparent display bubble boxes are nested one on top of each other, thereby exposing the product contents therein to the consumer and, whereby different products can be displayed side by side on a single hook.

9. The planogram assembly for product display cards as in claim 8, further comprising a hollow dispensing storage sleeve or container for dispensing stored sets of said nested product display cards,
   said nested sets of product display cards being nested inside said hollow dispensing storage sleeve or container;
   said nested sets of product display cards being urged in place by flexible spring loaded retainers associated with said hollow dispensing storage sleeve or container, whereby a set of nested product display containers is incrementally removable and dispensed from said hollow dispensing storage sleeve or container.

10. A method for using display cards to retail products comprising the steps of:
    mounting a product within a protruding transparent package box on each display card and;
    placing the transparent package box on each display card in a different location in a group of said display cards;
    nesting said display cards in said group so that all of said display cards are flush with each other, but with the protruding transparent package boxes being grouped and visible together to a potential purchaser displaying said different products side by side;

mounting a number of groups of said nested display cards on a hook in a retail environment using means aligned on top portions of said display cards to engage said hook whereby a larger number of said display cards can be mounted on a single hook due to nesting of said display cards.

11. The method of claim 10 in which said display cards in one or more of said groups comprises each display card in the nesting arrangement having a different height consisting of tall, medium and short heights.

12. The method of claim 11 in which the tallest display card is placed in a rear position of the group, and progressively shorter cards in front of said tallest display card, all of said display cards being flush with each other, with the protruding transparent package boxes appearing stacked and visible together to a potential purchaser.

13. A nesting arrangement of a plurality of display cards comprising;

each display card in the nesting arrangement having a different height consisting of tall, medium and short heights;

each display card having a protruding transparent package box containing a product for display and a top portion with means to engage a hook;

the transparent package box on each display card in the nesting arrangement having a differing location on its respective display card; and said arrangement of display cards being nested and mounted on said hook; with the tallest display card in a rear position and progressively shorter display cards in front of said tallest display card, all of said display cards are flush with each other, while positioning the nesting arrangement on the same hook due to nesting of said display cards.

* * * * *